(12) United States Patent
Brooks et al.

(10) Patent No.: US 6,370,817 B1
(45) Date of Patent: Apr. 16, 2002

(54) TREE BRACING SYSTEM

(76) Inventors: Alvin E. Brooks, 4730 Hypoluxo Rd., Lake Worth, FL (US) 33463-7513; Dean R. Ferrie, 530 Linnet Cir., Delray Beach, FL (US) 33444

( * ) Notice: Subject to any disclaimer, the term of this patent is extended or adjusted under 35 U.S.C. 154(b) by 2 days.

(21) Appl. No.: 09/627,291

(22) Filed: Jul. 28, 2000

(51) Int. Cl.[7] .............................................. A01G 17/14
(52) U.S. Cl. ................................. 47/43; 24/19; 24/273
(58) Field of Search ............................ 47/42, 43, 40.5; 248/524–529, 519–522; 24/279, 280, 19, 273

(56) References Cited

U.S. PATENT DOCUMENTS

| | | | |
|---|---|---|---|
| 952,655 A | * 3/1910 | Wagner | 248/524 |
| 2,501,255 A | * 3/1950 | Bell | 47/43 |
| 2,689,701 A | * 9/1954 | Whitaker | 248/524 |
| 4,088,294 A | * 5/1978 | Aliment et al. | 248/519 |
| 4,318,246 A | 3/1982 | Jungbluth | |
| 4,319,428 A | 3/1982 | Fox | |
| 4,520,590 A | 6/1985 | Schuh | |
| 4,562,622 A | 1/1986 | Takabatake | |
| 4,649,666 A | 3/1987 | Ness | |
| 4,699,347 A | * 10/1987 | Kuhnley | 248/516 |
| 4,754,530 A | * 7/1988 | Lindblad | 24/169 |
| 4,778,140 A | * 10/1988 | Karlewski | 248/524 |
| 4,848,027 A | 7/1989 | Skierwiderski | |
| D310,769 S | 9/1990 | Jensen | |
| D310,948 S | 10/1990 | Jensen | |
| 5,002,252 A | * 3/1991 | Setala et al. | 248/533 |
| 5,129,179 A | 7/1992 | Kronmiller | |
| 5,199,214 A | 4/1993 | Caldwell | |
| 5,257,439 A | * 11/1993 | LeBlanc | 24/269 |
| 5,402,600 A | * 4/1995 | Tompkins | 47/42 |
| 5,465,529 A | * 11/1995 | Park | 47/40.5 |
| 5,590,865 A | * 1/1997 | Odom, Jr. | 248/524 |
| 5,797,580 A | * 8/1998 | Ryberg | 248/523 |
| 5,842,676 A | * 12/1998 | Plzak | 248/523 |
| 5,950,359 A | 9/1999 | Pivnik | |

FOREIGN PATENT DOCUMENTS

JP        409191775 A   *   7/1997   ..........  A01G/17/04

* cited by examiner

Primary Examiner—Peter M. Poon
Assistant Examiner—Son T. Nguyen
(74) Attorney, Agent, or Firm—Main, Haley + DiMaggio, P.A.

(57) ABSTRACT

A manual and tool adjustable, reusable tree bracing assembly to support a tree in a substantially vertical position, being specifically structured to allow mounting and removal of the assembly about a tree trunk by a single worker wherein the assembly comprises padded support members movably positionable at spaced apart locations from one another about the circumference of a tree trunk along a length of two adjustable straps and further including at least three brace members and at least three padded support members accommodating the straps wherein one support member is adjustably configured to provide virtually non-slip strap attachment with lock-down option and wherein the distal end of each brace member engages a base member removably fixed to the ground or to a tree grate substantially adjacent the tree trunk and the proximal end of each support member is disposed in abutting engagement with the outer surface of the grooved, padded support members so as to exert a supportive, bracing force on the tree trunk yet reduce or eliminate the possibility of moisture accumulation, mildew, scarring and erosion of the exterior surface of the tree trunk.

10 Claims, 7 Drawing Sheets

TREE BRACING SYSTEM

BACKGROUND OF THE INVENTION

1. Field of the Invention

This invention relates to a tree bracing assembly and method for supporting a tree in a substantially vertical position such as with a young tree or newly planted tree which requires stabilization.

2. Description of the Related Art

Bracing of trees is well known, and is generally accomplished by using several stakes pounded into the ground at a distance from and around the periphery of the base of the tree, generally using a series of ropes, flexible lines, wood, guy wires, or the like which are connected to the tree's trunk or limbs at a point spaced above the ground and extended downwardly and outwardly in an inclined angular direction for adjustable attachment to a ground inserted stake. While these arrangements function fairly well the installation of the anchoring devices or tie downs is time consuming as the length of the lines, guy wires, or supports must be adjusted or assembled together while they are being attached to the ground anchor often requiring more than one laborer and multiple tools. These systems may also entail wrapping the circumference of a tree trunk segment with a protective material, such as burlap, in an attempt to protect the tree trunk from scarring at the point where the anchoring component encircles the tree trunk. It is not uncommon for such tree bracing construction and wrapping to take 30 minutes or more per tree and to require more than one laborer, particularly with larger trees.

Wooden blocks engaging the tree trunk which are spatially positioned about the wrapped tree trunk segment and in overlying relation to the protective covering surrounding the trunk segment have also been used with one or more metal bands which are then positioned to surround all of the aforementioned trunk engaging members through frictional engagement or fixed attachment to an outer surface thereof. The metal bands are thereby forced into in confronting engagement with each of the trunk engaging members so as to substantially fix their positions relative to the tree trunk. A supportive force is applied to the tree at the points of engagement of the trunk engaging members by the application of an elongated board or like structure which fixedly attaches, such as by nailing, the bracing boards directly to the trunk engaging blocks. Other types of fixed engagement of the corresponding ends of the bracing members are also utilized.

U.S. Pat. No. 4,520,590 to Schuh discloses a circular, staked ground mounted base spaced from the tree, a pair of opposing brace members having a pair of upwardly extending legs and a rubber tubing cushioned collar of a width so as to not place it in direct and constant contact with the trunk. The collar width provides substantial space between collar and tree trunk and permits movement of the tree trunk within thereby decreasing the stability of the upright support and creating the potential for a less than vertical tree anchoring. It is also thought that the pair of brace members each with a parallel pair of upward leg extensions is not as stable to outside forces, e.g. wind and debris due to its parallel planar arrangement not being as able to withstand forces perpendicular thereto. Other collar like devices such as the adjustable, padded trunk holding ring and tree stakes in U.S. Pat. No. 4,848,027 to Skierwiderski, U.S. Pat. No. 5,199,214 to Caldwell, U.S. Pat. No. 4,462,622 to Ten Pas and a hinged foam-lined collar in U.S. Pat. No. 5,402,600 to Tompkins have also been used to support young trees. Hooks and rings attached to stakes to support trees have also been described such as in U.S. Pat. No. 4,649,666 to Ness and U.S. Pat. No. 5,129,179 to Kronmiller.

Design U.S. Pat. Nos. 310,769, and 310,948 to Jensen, disclose double and single clamp tree braces respectively, which are structurally dissimilar to the present invention, however, depict an apparent disadvantage of not providing support to the tree in all planes thereby subjecting the tree to instability and movement in the direction which is substantially perpendicular to the plane created by the ground support(s). These patents and others such as U.S. Pat. No. 4,318,246 to Jungbluth and U.S. Pat. No. 4,319,428 to Fox reveal configurations of strap-like anchoring in direct contact with the tree trunk which has been known to cause damage to the exterior surface of the tree trunk.

U.S. Pat. No. 5,950,359 to Pivnik describes a tree staking system with a plurality of padded support members movably positioned and spaced apart along the length of an attachment assembly about the circumference of a tree and including an equal number of brace members disposed in abutting engagement with the support members so as to exert a supportive, bracing force on tree trunk. Although the Pivnik system protects the tree trunk from scarring and can be mounted by a single laborer, its means for tightening the support members against the tree trunk is restricted to and limited by the amount of manual pulling, pushing and gripping strength of the laborer on narrow cable-like ties and has narrow strap gripping area as well. Also, heavy wood pieces and nails remain necessary to adequately secure the bracing members to the support members which makes transporting the assembly unwieldy for one laborer and time consuming to assemble and disassemble.

A more primitive variety of tree brace arrangement has been frequently used over the years and consists merely of nailed 2×4 type boards for bracing against the ground and the support members with metal bands wrapped around the wooden block support members placed against the tree. This is a relatively inexpensive assembly which adequately functions, however, due to high labor costs there is no motivation to disassemble it and remove the parts when the need for support no longer exists. This leaves unsightly support assemblies in place, often years after tree stabilizing has been accomplished.

Although a variety of tree bracing systems exist, disadvantages abound. For instance, thin guy wires or ropes pose a physical danger to people and animals because the wires and ropes are difficult to see and can easily be unknowingly and dangerously encountered. Single use application systems, full on site assembly, and multiple laborers and tools required for proper installation make many systems expensive. Failure to disassemble and remove the supports when support is no longer necessary is unsightly and polluting to the environment and time consuming to install. Physical injury to the tree arises many times from stiff straps or metal bands in firm direct contact with the trunk. Also encountered has been physical injury to the laborers during installation of the tree brace assemblies using metal bands when the band breaks, slips or grip is lost, the metal bands have been known to flip back impacting and injuring the worker. Single, double, or only planar staking creates stability problems when a destabilizing force e.g. wind, is imposed against the tree from a plane perpendicular to the staking. Loss of stability also occurs due to a "push-pull" effect on the fastening members, usually nails holding both the ground base arrangement and the arrangement against the tree trunk itself in the prior devices, from wind or other forces against the tree which loosens these fastening members on the side opposite the destabilizing force. Leaning and less than a vertical arrangement may result where direct contact with the tree is not present such as in the spaced collar type devices. The burlap or other material used to cushion the tree trunk is time consuming to install and often allows moisture to accumulate and mildew to form causing an eroded or blemished region on the outer surface of the tree trunk as well as requiring additional time and labor to wrap the tree at the point where the anchoring device contacts the tree. Heavy wood bracing boards prove to be unwieldy requiring full on site assembly which is time consuming and often requires multiple workers. Most Difficulty also arises in anchoring the bracing members to grates that often surround trees particularly in urban areas because the standard staking absent direct contact with the ground cannot function. Another problem is theft of the tree brace assembly, which is encountered particularly in high traffic public areas e.g. medians, schools, public parks and government buildings.

Accordingly, there is a need for a tree bracing system which is self-contained, substantially pre-assembled, reusable, easy to transport and install by a single worker without a large amount of tools and equipment, reduces the possibility of blemishing or marring of the exterior surface of the tree trunk, is lockably secured, is adjustable to varying tree sizes, is installable and removable by a single worker, provides maximum stability in all directions without loosening of fastening members, is usable with tree grates, and includes structural components which are physically less injurious.

SUMMARY OF THE INVENTION

The present invention is directed towards a tree bracing system designed to support and maintain a tree in a substantially vertical position. Such supportive bracing is normally required for trees during the replanting process and usually continues until the roots are solidly implanted in the ground. More specifically, the preferred embodiment of the subject tree bracing assembly comprises at least three padded support members. Two adjustable, soft, durable, flexible straps are used to removably but securely position the support members in spaced relation to one another circumferentially about the trunk of the tree being supported. The two substantially parallel spaced-apart straps, are preferably formed of a high strength, flexible and durable material such as nylon or polyester, capable of being held in place by two flexible pressure-sensitive brackets each with a serrated edge gripping the straps and pressing said straps against the serrated edge to prohibit loosening or slippage of the straps within the support members. The straps pass through open-ended, elongated channels which extend through each of the support members and allow sliding movement of the support members along the length of the straps. Further, structurally, along one side and integrally connected within only one of the support members i.e., the strap adjusting support member, are vertically spaced extensions with center cut openings of a size and shape capable of accommodating a tool from either end, for use in tightening, i.e. decreasing the circumference, of the straps once the support members and straps are positioned as desired in first a loose planar frictional engagement around the girth of the tree trunk. The tool tightening action generated at the strap adjusting support member provides the ability to individually tighten each strap. The bottom portion of the channel located proximal to the vertically spaced extension in the adjustable support member creates a lipped serrated edge which cooperately operates with the serrated edge on the pressure sensitive strap retaining member to place a slight bend in the strap, providing dual action gripping of the strap and prohibiting slippage of the strap within the channel. As the slotted tool engages one strap at a time in the slot and is rotated, the circumference of the strap is decreased and strap is tightened, forcing the support members into firm frictional engagement with the tree trunk, the force being dispersed over the entire surface of each padded support member. The pad of the support member is preferably arcuate in overall structure although it functions in a planar form as well, as it engages the tree trunk and is preferably vertically grooved, substantially perpendicular to the ground which allows a flow of water and air within the grooves which prevents or reduces the likelihood of mildew forming such as what occurs when burlap or other material is used for protection as with other devices. In one embodiment release of the strap retaining member is accomplished by manually pulling a lever or arm-like protrusion in the direction of the fasteners fixating the strap retaining member to the support member thereby disembedding the serrations and allowing strap to be straightened and moved slidably through the channels in the support members. In addition, because the tree bracing assembly does not require a large area of contact of the support member with the tree trunk to function properly, a majority of the exterior trunk surface remains uncovered, freely exposed to needed air and water. As such only a minimal area of the tree trunk is covered and even that area is has a ventilating channeled pad.

In order to apply the proper bracing force to the tree trunk, preferably at spaced apart locations about the circumference of the tree trunk, a brace assembly is provided in the form of at least three elongated, rigid brace members each cooperatively engaging one of an equal number of support members. The brace members may be any elongated shape, and in one solid part or two or more parts adjustably fixated to variable lengths in a telescoping arrangement one part within other to create optional lengthening of the brace members for use with a variety of height of trees. Each of the brace members comprises a proximal end disposed in force transferring pivotal engagement with the outer surface of each support member and a distal end pivotally engaging a base member bracket fixedly attached to the upper surface of a base member which is fixed to the ground by one or more stakes passing through at least one opening in the base member and said base member, as assembled, being situated at a lateral distance from but around the periphery of the tree to be supported. A "J" bolt and nut, or the like, may also be used to anchor the base member to a tree grate surrounding the base of the tree, with the looped end of the "J" slipping under and engaging one of the slats in the grate while the vertical stem of the "J" passes up through the one or more openings in the base member being then tightly secured by tightening a nut thereto which lies adjacent to and overlapping the base member opening(s).

The support members are cooperatively structured and configured as to receive and retain the proximal end of one if of the brace members. The support members and base member brackets are secured to the elongated rigid brace members by a fastener, e.g. wing-nut and bolt or the like for easy hand manipulated installation and adjustment without the need for extra types of tools such as a wrench, pliers, or hammer and nails, or any additional laborers. The brace members in addition to being physically visible due to size may be painted or wrapped with reflective tape or florescent colors to enhance visibility and thereby diminish the likelihood of physical injury to humans and animals.

Therefore, it is an object of the present invention to provide a self-contained, substantially pre-assembled, reusable adjustable tree bracing system designed to support a tree in a substantially upright predetermined position, which is easily transported, mounted, and tightened into bracing position and removable by a single worker.

Another object of the present invention is to provide a tree bracing system which supplies and maintains adequate bracing or supporting forces circumferentially to the trunk portion of a tree without scarring, blemishing or otherwise damaging the exterior surface of the tree trunk at the points where the supportive forces are applied.

Yet another object of the present invention is to provide a tree bracing system comprising trunk engaging support members each of which accommodates a single bracing member which is easily and efficiently positionable at and removable from a variety of locations and angles about the circumference of a variety of sized tree trunks so as to create maximum stability.

Still another object of the present invention is to provide enhanced visibility and safety from physical injury to humans and animals.

Another object of the present invention is to provide a lock down tree bracing assembly to minimize theft of and vandalism to the assembly.

Yet another object of the present invention is to provide a tree bracing system which can easily be secured to and removed from tree grates.

Another object is to provide a tree bracing assembly which does not loosen over time when destabilizing forces are applied in a variety of directions.

These and other objects, features and advantages of the present invention will become more clear when the drawings as well as the detailed description are taken into consideration.

DETAILED DESCRIPTION OF THE PREFERRED EMBODIMENT

Figure 1:
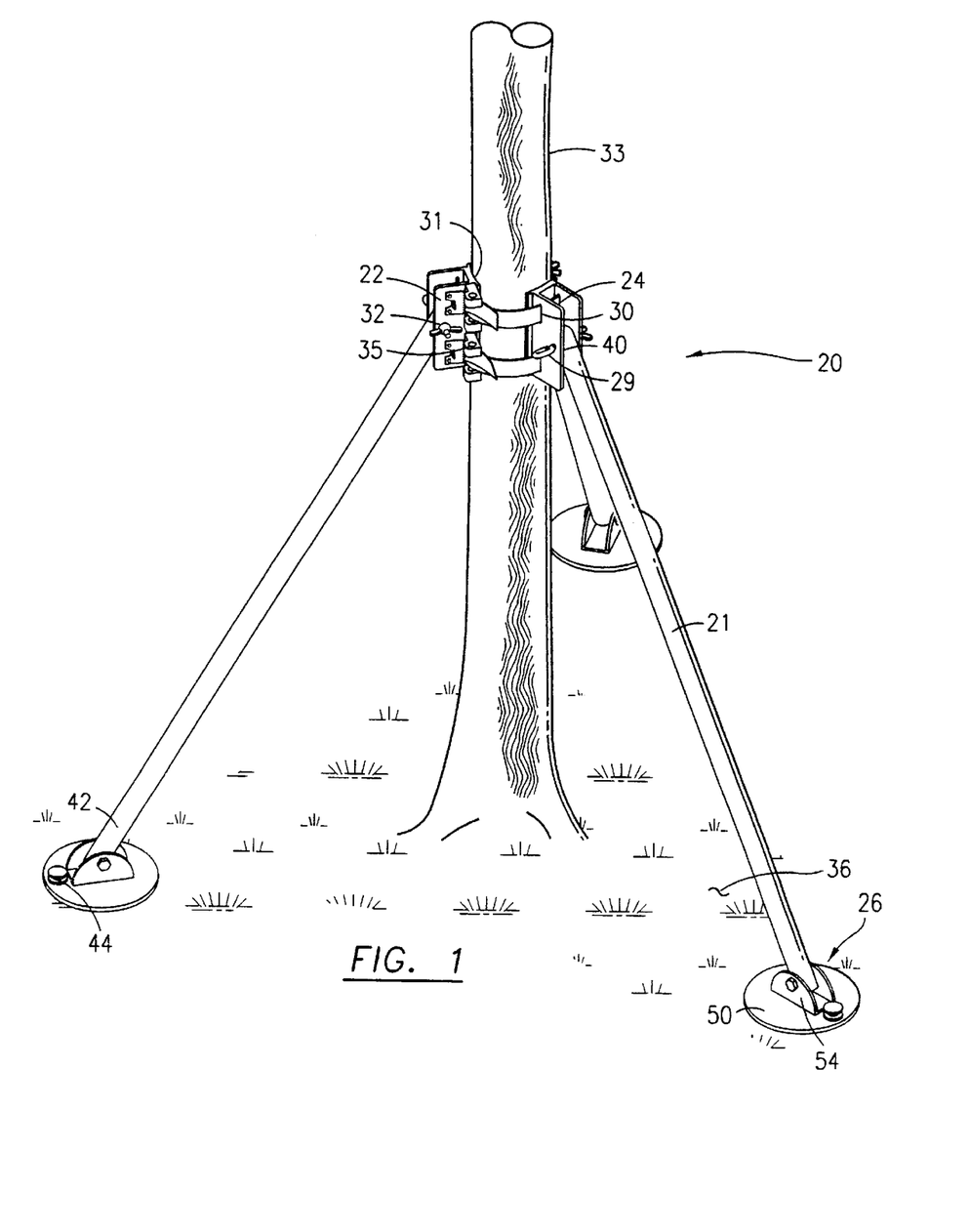
FIG. 1 is a perspective view of the present invention in operation on the ground supporting a tree.

Referring now to the drawings, and in particular FIG. 1, the present invention is shown generally at 20 including at least three brace members 21 and at least three (equal number of) support members 22 disposed in confronting engagement with the exterior of tree trunk 33. At least three support members and an equal number of brace members is preferred as such arrangement creates a stable geometric plane of support, unlike what exists when only one or two brace members is used. A greater number of brace members can be used to apply additional supportive force at spaced locations on the ground 36 about the circumference of the tree trunk 33 to maintain the tree in substantially vertical position so long as the number of support members equals the number of brace members. Although the brace members as shown are equally spaced away from the tree and about the circumference of the tree such equal spacing and distance is not mandatory and may be altered depending for example, on the exact angle desired for the tree and space available for foothold of the brace members 21. Through all but one of the support members 22 run at least a first pair and second pair of laterally and vertically disposed open-ended parallel channels 30, through each lateral pair runs one of two flexible straps 23 intended to be disposed in closed loop configuration about the tree trunk, allowing the support members 22 to slide along the strap in adjustable confronting engagement with the exterior of the tree trunk 33. Through one support member, referred to as the strap adjustable support member, runs a third pair and fourth pair of open-ended channels 30 positioned beneath the first pair and adjacent the second pair of open ended channels through which the flexible strap is threaded creating the closed loop strap arrangement.

The preferred sliding movement of the support members 22 along the length of each of the soft, flexible straps 23 is facilitated by passage of the straps 23 through open ended channels 30 spaced at the opposite ends of the support members 22. Each channel 30 is specifically dimensioned and configured so as to allow sliding movement of the support members 22 along the length of the straps 23. This sliding movement facilitates a single person positioning the support members about the exterior of the tree trunk 33 at predetermined locations after merely reaching around and securing the straps 23 about the trunk of the tree. The soft yet durable texture and flexibility of the straps minimizes damage to the tree trunk if and when the straps are in direct contact therewith.

Figure 2:
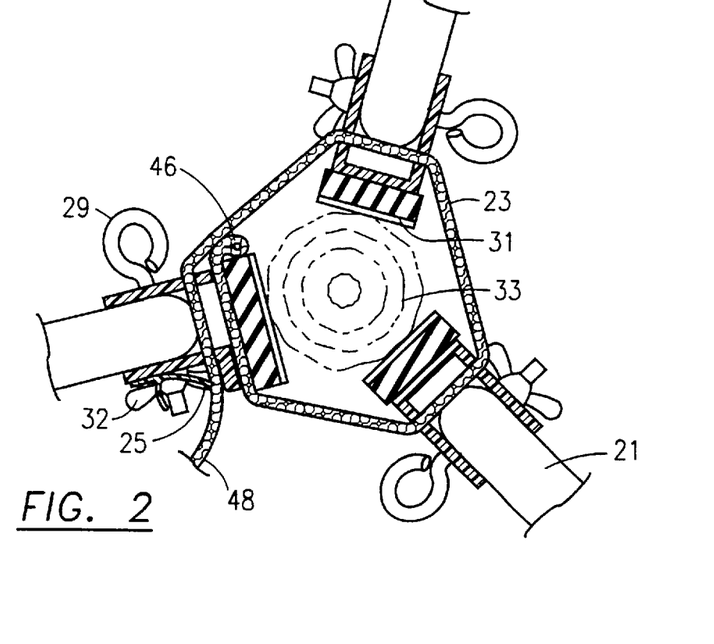
FIG. 2 shows a top plan cross-sectional view of a non-strap adjusting support member through 8—8 in FIG. 4.
Figures 8, 8A:
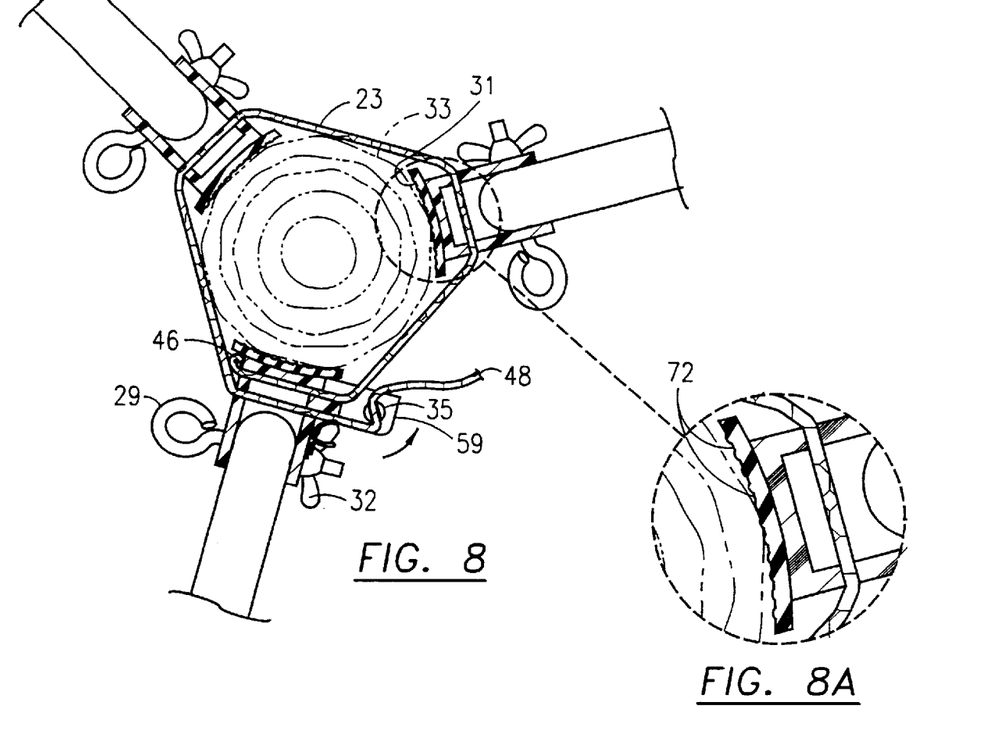
FIG. 8 shows a top plan cross-sectional view of the strap adjusting support member through 8—8 of FIG. 4.
FIG. 8A is a top plan cross-sectional view of the grooved protective pad in enlarged detail of designated area of FIG. 8.

Another important feature of the present invention as shown in FIGS. 2, 8, and 8A is the provision of a protective portion 31 on the inner surface of each of the support members 22. Such protective portion is in the form of a water resistant, resilient, cushion-like pad 31, such as rubber, which is disposed so as to confrontingly engage the exterior surface of the tree trunk 33 at locations where each of the support members 22 are operatively positioned. The protective pads 31 are preferably at least slightly arcuate in structure to conform reasonably to the curve of the tree trunk. Grooves 72 on pad 31 run vertically and substantially parallel to the tree trunk to allow water and air to pass between the tree trunk 33 and the pad 31. Pads 31 are structured to prevent or eliminate scaring or blemishing of the exterior surface of the tree trunk 33 even though a significant bracing or supportive force is transferred to the tree trunk 33 at the locations of the support members.

Figure 12:
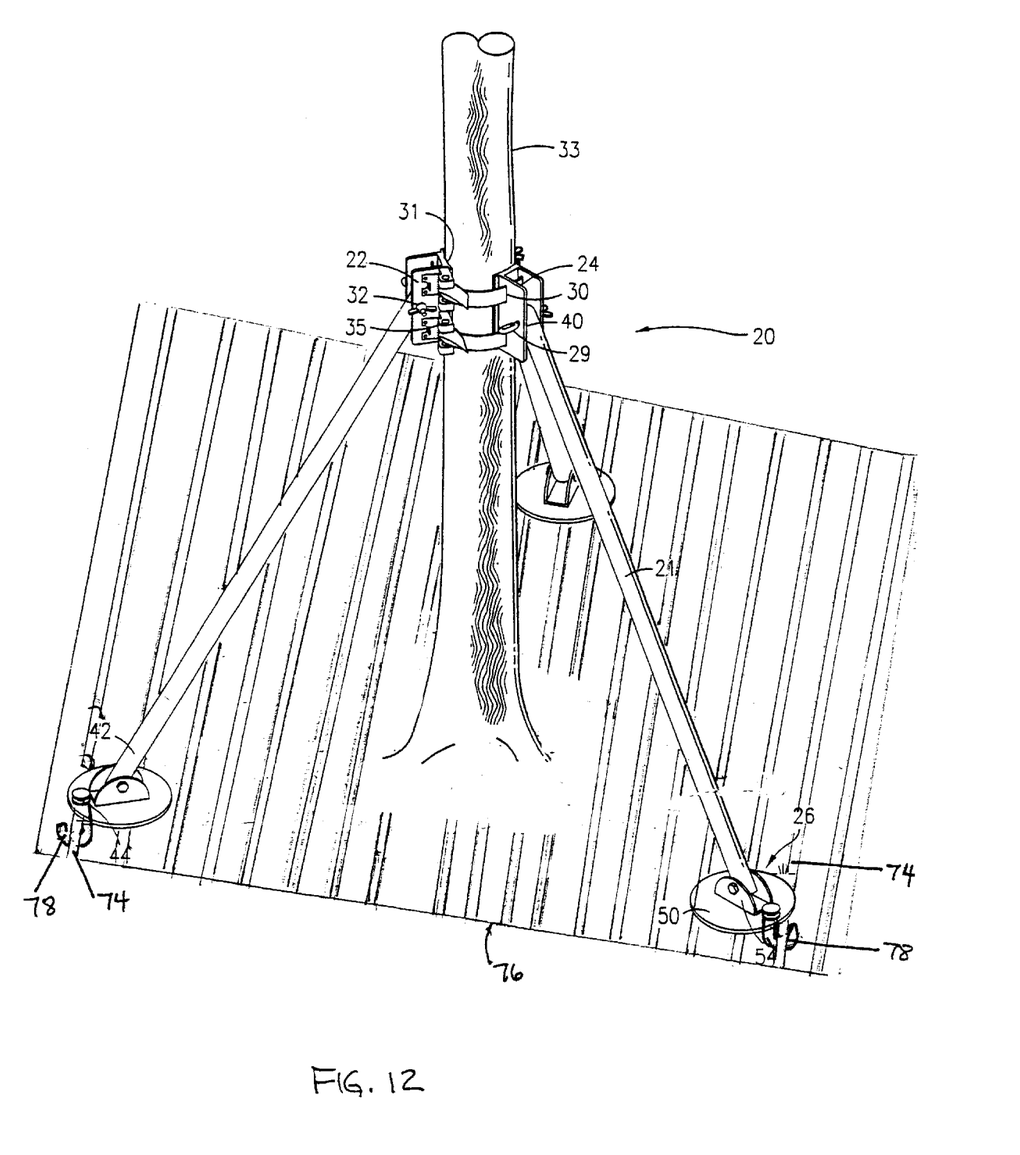
FIG. 12 is a perspective view of the present invention in operation with a tree grate supporting a tree.

At least three brace members 21 are further provided to engage the outer surface 24 of each of the support members 22. With reference to FIGS. 1 and 4, each of the brace members 21 has a proximal end 40 disposed to engage and be retained by the outer surface of each of the support members 22 using a fastener, such as an eye bolt 29 and wing nut 32 to create an adjustable, tightenable, rotatable, and pivotal, positioning of the brace member 21. The bolt 29 and nut 32 fastener withstands the "push-pull" loosening effect at both ends of the brace member and thereby provides a more stable bracing assembly, particularly over extended periods of time. Each of the brace members are operatively positioned in an angular orientation such that the opposite or distal end of each of the brace members 42 is preferably pivotally engaging a retaining bracket 54 fixed to the top surface 50 of base number 26 which is disposed in penetrating relation to the ground 36 using a fastening member preferably a stake 44, driven through opening 38 in base member 26 with the bottom surface 52 of base member 26 being firmly a fixed to ground 36 as seen best in FIGS. 3 and 4. FIG. 12 shows another embodiment of the present invention in conjunction with a tree grate 76 surrounding the base of the tree trunk 33 which is often used in inner city planting with the base member 26 anchored to slat 74 of the tree grate 76 using a standard type "J" bolt 78 and nut fastener which loops under the slat 74 and the nut tightened to provide firm frictional engagement of the "J" with the slat thereby securing the base member to the tree grate. It should be apparent that these operative positionings provide the aforementioned supportive force to each of the support members 22 and accordingly to the tree trunk 33.

Figure 4:
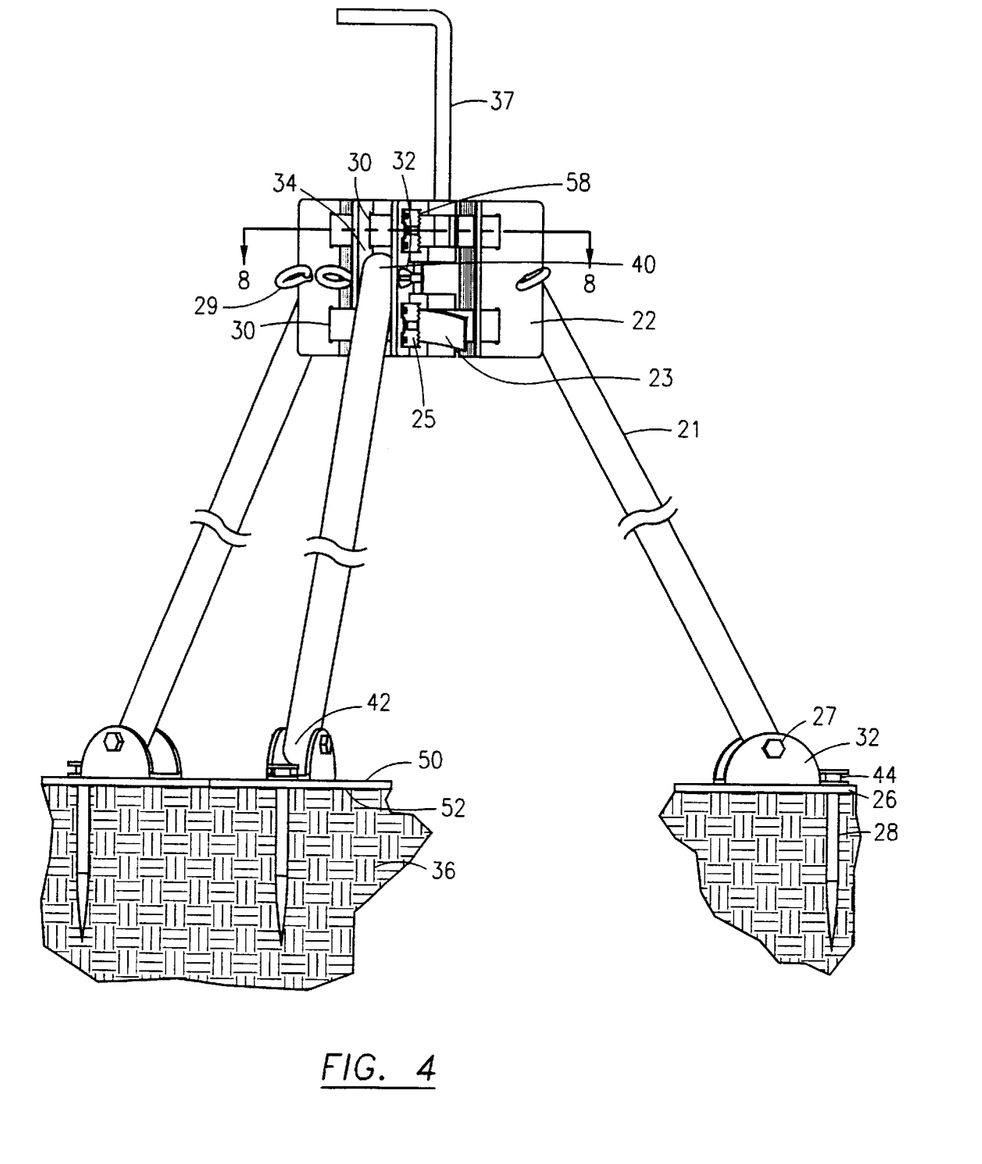
FIG. 4 is a side elevational view of the present invention showing brace members of indeterminate length and strap adjusting tool in place within the top opening in the strap adjusting channel of the adjustable support member.
Figure 5:
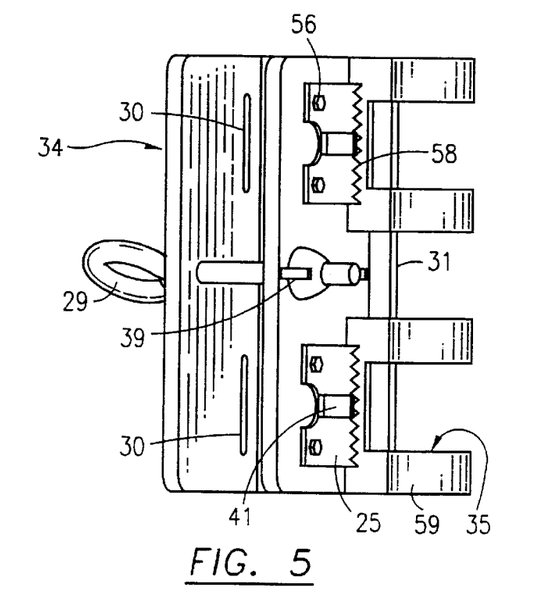
FIG. 5 is a rotated side elevational view of the strap adjusting support member and strap adjusting channel in accordance with the present invention.
Figure 9A:
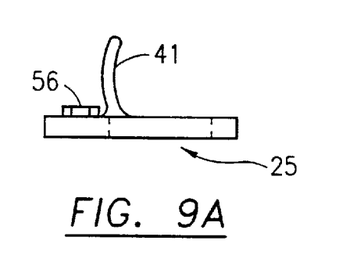
FIG. 9A is a bottom edge side view of the strap retaining member with C-shaped arm.

Strap retaining members 25 are fixedly attached to the lateral portion of the one adjustable support member as seen in FIGS. 4 and 5 each having one serrated edge 58 which grips and secures the flexible straps 23 preventing slippage. The strap retaining member may be fixed to the support member 22 using one or more fasteners, such as bolts 56 but preferably two per strap retaining member, as shown in FIG. 5, which creates a hinged pressure point which aids the serrated edge 58 in gripping the straps 23 due to the natural downward pressure created by the bolted edge of the strap retaining member against the support member 22. Each of these strap retaining members 25 cooperates with the opposite ends 48 of each strap 23 so as to allow passage of the end 48 through the strap retaining member 25 and facilitate the tightening of each of the straps in a fixed position about the trunk 33 so as to fixedly but removably maintain the support members in their operative, force transferring position as best shown in FIGS. 2 and 4. The strap retaining members 25 may be additionally structured so as to allow release of the ends 48 of the straps 23 as well as a portion of the length thereof engaged by the strap retaining members 25, thereby permitting further adjustment and/or re-use thereof. The opposite end 46 of strap 23 is folded back over and stitched, glued or otherwise attached to itself to create a thickness on the strap which will not pass through the strap channels 30 and will serve as a connector portion of the strap to the support member at time of fastening and tightening to restrict the strap from sliding completely through the channel. The strap retaining member releasing means 41 as shown in FIGS. 5 and 9A is manually pulled in the direction opposite the support member to lift the strap retaining member from its closed arrangement pressing down upon and gripping the strap, to an opened arrangement releasing the serrated edge 58 from contact with the strap 23 and simultaneously releasing the strap from the curved pressured engagement with the serrated bottom edge 62 of the strap channel 30 which allows the strap 23 to slide in both directions. Such release allows the strap circumference to be made smaller, larger or to completely eliminate the looped arrangement such as at time of removal of the tree brace assembly from around the tree.

Figure 7:
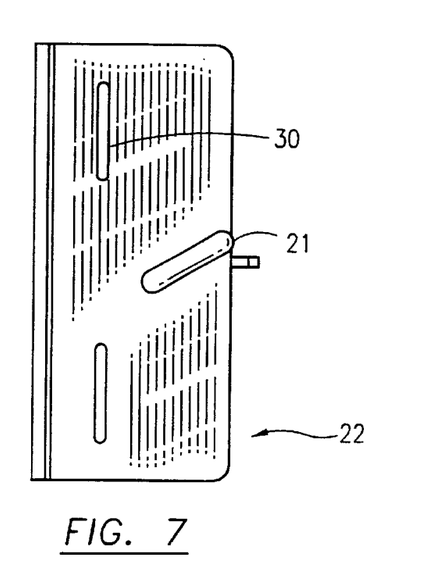
FIG. 7 is a lateral side view of a support member without the strap adjusting tool channel or strap retaining bracket.

FIG. 7 shows a non-adjustable support member 22 with vertically positioned channels 30 for the straps 23, and a fastening means shown, as an eye bolt 29 which will pass through the proximal end of and connect each brace member to a support member. The non-adjustable support members do not have the strap retaining members 25 or strap adjusting projections 59 or center cut openings 35 because only one such adjustable support member is necessary to tighten the tree brace assembly regardless of the number or size of support members and brace members utilized to support the tree, as shown in FIGS. 5 and 8.

It should therefore be apparent that the assembly may be easily mounted in its operative position as shown in FIG. 1 by a single worker and just as easily and efficiently be removed therefrom once support or bracing of the tree 33 is no longer required. In particular, a single worker simply extends the straps 23, with the support members 22 bunched together in orientation about the tree trunk 33, and secures the strap in place utilizing the strap retaining members 25. Once loosely secured, the support members 22 are slideably moved about the tree trunk 28 until disposed in a desired position and further strap tightening is performed to establish firm frictional engagement of the support members about the tree.

Figure 6A:
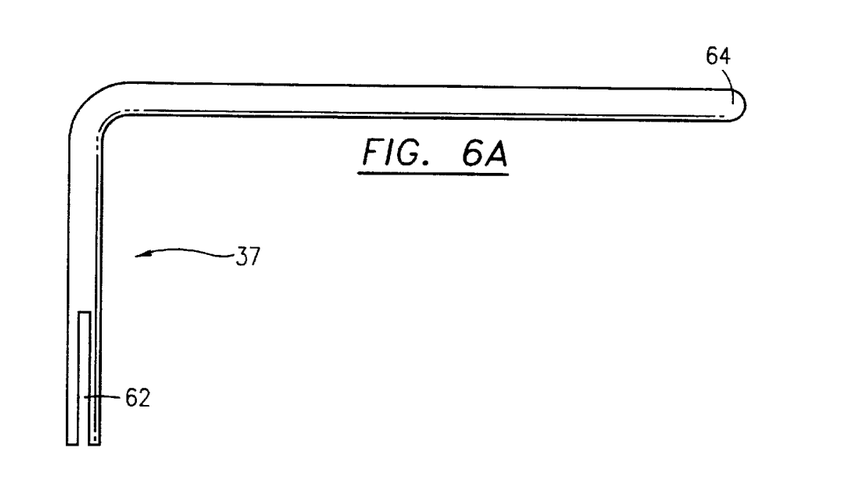
FIG. 6A is a side view of the strap adjusting tool.
Figure 6B:
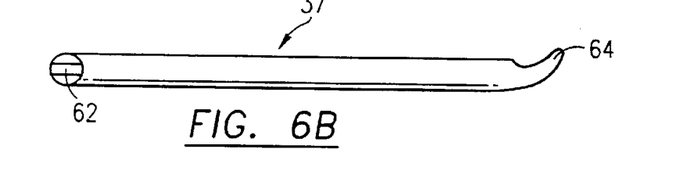
FIG. 6B is an end side view of the strap adjusting tool.
Figure 9B:
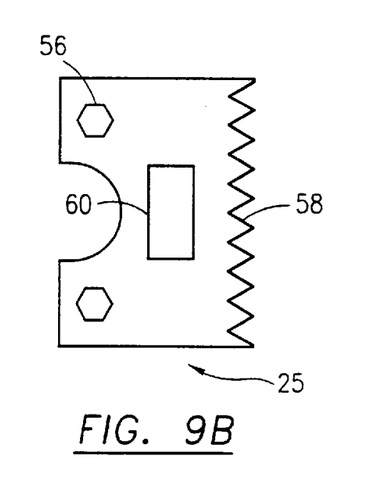
FIG. 9B is a top view of the strap retaining member.

Another embodiment of the present invention relates to the strap retaining member 25 shown in FIG. 9B, particularly useful in areas where vandalism or theft of the support assembly may occur, comprises an opening 60 of a size and shape to accommodate a flat head screwdriver or the flat head end 64 of the strap adjusting tool 37 shown in FIGS. 6A and 6B which is opposite the end 80 of the tool such that twisting tool 37 essentially locks down the strap retaining members 25 into a firm gripping orientation against the straps, pressing the straps into a curved alignment against the serrated lip formed by the bottom serrated edge 62 of the strap channel 30 thereby reducing the likelihood of theft without the proper tools to untighten it. A top plan cross-sectional view of the tree bracing system embodiment shown with the tool adjustable support member is in use about a tree seen in FIG. 8. The tree bracing system may be constructed with all non-support members, particularly on the smaller versions for homeowner type of use as shown in FIG. 2 or may be constructed with one tool adjustable support member as shown in FIG. 8 having tool adjusting projections 59 embodied in and extending laterally from the support member 22 and forming opening 35 of a size and shape to accommodate the strap adjusting tool 37, the projections 59 are also shown in FIG. 5. Lastly, the brace members are spread out in the desired place at the preferred angle for maximum support as determined by the installer, and stake 44 driven into the ground 36 through opening 38 in each the base member 22. Opening 38 may be positioned to the back or side of the base member bracket as determined by the installer to be of maximum stability. More than one opening 38 may be provided in the base member to accommodate more than one stake to more securely attach the member to the ground.

Figure 3:
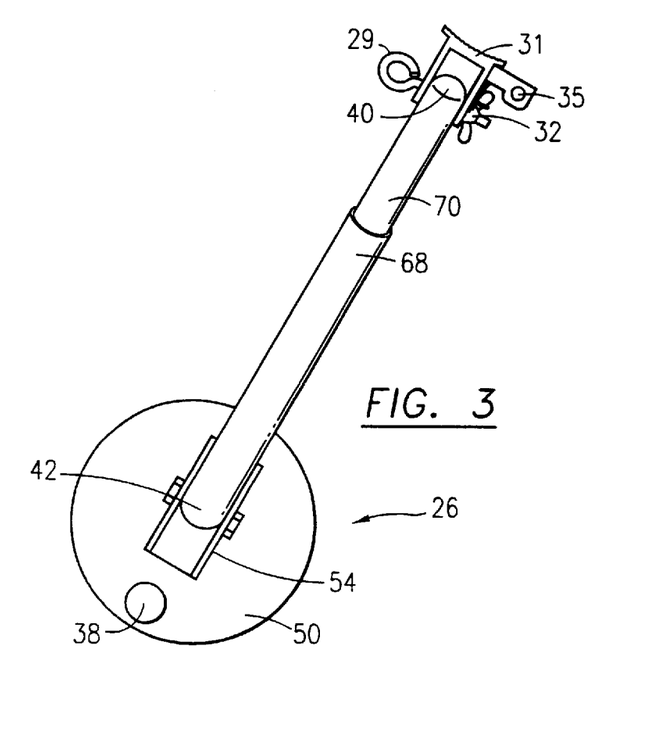
FIG. 3 is a top plan view of one embodiment showing one adjustable support member, and telescoping brace member.

FIG. 3 is a top plan view of one embodiment with a smaller in diameter upper elongated leg 70 of the brace assembly telescoping down into the larger diameter lower elongated leg 68 of the brace member 21. Although virtually any size diameter and length of tubing may be used for the brace members, depending on need, it is critical to telescoping that the upper portion be smaller in diameter than the lower portion of the brace member to allow it to slide down into the lower and both must be of a diameter and strength to support the tree desired. It is also preferred but not mandatory, that at least one foot of the upper elongated leg 70 remain within the lower elongated leg 68 during telescoping for the maximum utility combination in strength and extension. The range of one half inch (½) to one and one-half inch (½) diameter for the brace members is preferred but other diameters outside these ranges can be used, for tree brace assemblies which telescope as well as those which do not. The preferred length of brace member legs measured from the support member to base member, whether or not telescoped, range from a little over three feet to in excess of nine feet, although lengths outside this range can be used depending on tree height, tree circumference and weight, and soil and environmental conditions, just to name a few. To reduce acquisition and transportation costs particularly on larger trees, wood such as (2×4) two by four boards, or the like may be used as the brace assembly and fastened, such as by bolts to the support members and base members in place of the brace assembly tubing, which is preferably steel, but could also be made of aluminum, high strength plastic or other durable material. If telescoping of the legs is needed the material used should be such that a hollow construction could be achieved so as to accommodate one leg portion sliding into the other. The diameter of base member 26 can also be any desired size, however, it is recommended that in selecting the size that the soil conditions and size of the tree being supported be taken into consideration, recognizing that large trees and soft soil would necessitate a larger circumference of the base member and deeper or multiple staking into the ground. The general, but not exclusive range of base member circumference for most commonly encountered trees is between four inches and one foot. The ground fastening means is preferably a removable stake 28 which can be made from wood, plastic, metal or other durable high-strength material of a diameter preferably, but not exclusively, from one-half inch to one inch and driven into the ground through at least one opening 38 in the base member to a depth capable of supplying adequate supporting force to the tree, preferably from one to two feet. The stake head 44 ideally has a cap-like arrangement shown in FIG. 4, at the proximal end, which rests on the upper surface of the base member after installation and is pointed at the distal end for easier insertion into the ground. The cap-like proximal end provides an area for a crow bar or the like to grip and lift the stake from the ground when tree support is no longer necessary, or for adjustment or moving of the assembly, and for an enlarged hammer strike area at time of insertion.

Figure 10:
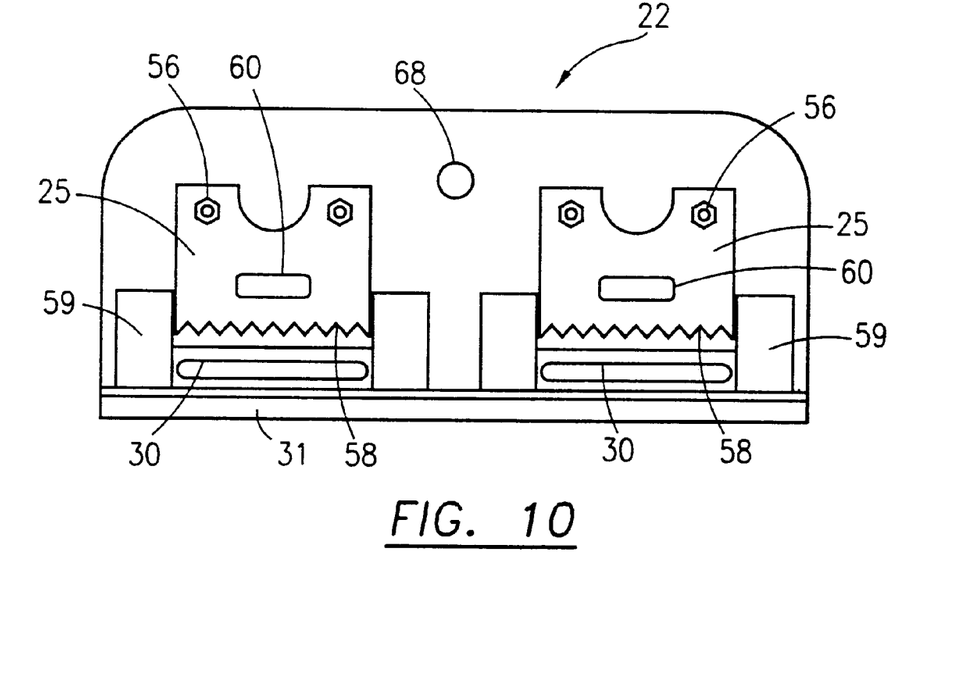
FIG. 10 is a longitudinal side view of a strap adjusting projections and strap retaining member.

FIG. 10 is a longitudinal side view of a support member 22 with strap adjusting projections 59 and strap retaining members 25. The strap retaining members 25 are fixed to the support member 22 by a bolt 56 or the like and an opening 60 capable of accommodating a flat head screwdriver or tool end 64 to lift said strap retaining member 25 away from the surface of the support member 22 releasing the grip on the strap 23 created when the bottom serrated edge 58 of the strap retaining member grips the strap 23 as it curves over and against the serrated bottom edge 62 of the strap channel 30 shown in FIG. 11 creating non-slip tension against the strap and firm frictional engagement within the support member and against the tree trunk. Absent a flat head screwdriver type device or tool end 64 to release the grip the likelihood of theft or vandalism of the tree support assembly is lessened and provides a virtually immovable strap attachment assembly to support the tree.

Figure 11:
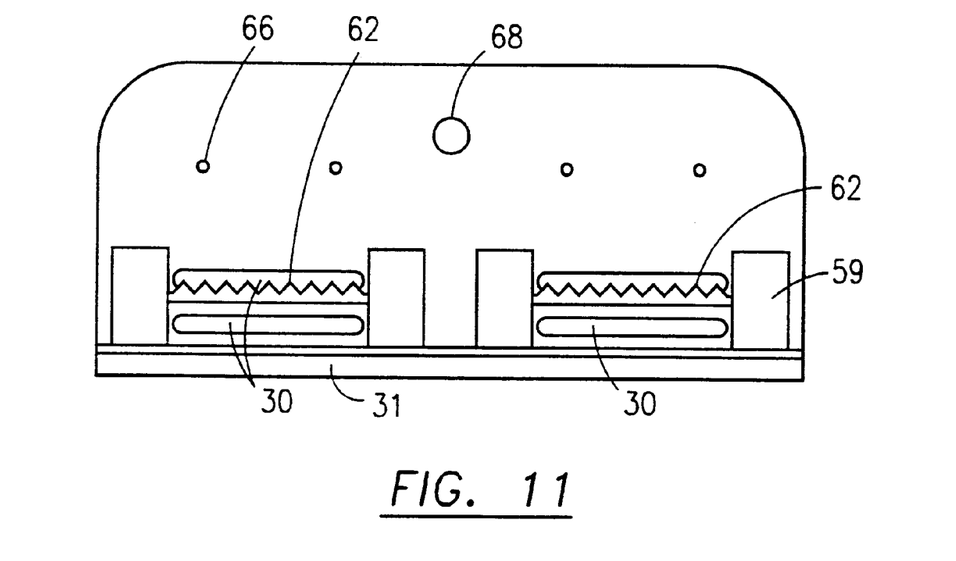
FIG. 11 is a longitudinal side view of the strap adjusting support member with strap retaining member removed.

FIG. 11 shows the same longitudinal side view as FIG. 10, however, the strap retaining member has been removed to reveal the bottom serrated edge 62 of the strap channel 30 located between the strap adjusting projections 59. The bolt 64 attaches support member 22 to the proximal end of brace member. Openings 66 are shown after removal of the bolts 56 and strap retaining member 25 from the support member 22. Opening 68 will accommodate the bolt or other fixating means to attach the support member to the proximal end of the brace member 21.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A tree bracing assembly designed to support and maintain a tree in a substantially vertical position, said assembly comprising:

at least three support members positionable in supporting and abutting engagement with a trunk of the tree to be supported;

two flexible straps of sufficient length to surround the tree trunk, operatively, movably and independently aligned within each support member and cooperatively structured such that each support member is selectively positionable in surrounding relation to the tree trunk and concurrently positionable along the length of each strap in any one of a plurality of positions into removable, surrounding and supportive engagement with the tree trunk;

a means for tightening said straps once the support members are positioned about the tree;

a means for retaining said straps once the support members are in forced engagement about the exterior surface of the tree to be supported;

an equal number of base members as support members;

an equal number of base member brackets as base members, one bracket being fixedly attached to said top surface of each said base member;

elongated legs equal in number to the base members, each leg having a distal end pivotally engaging said base member bracket which is configured to receive and retain said leg, one bracket being fixed to the top surface of each said base member, said base member being removably fixed to the ground, and a proximal end of each said leg pivotally disposed in abutting engagement with said outer surface of said support member which is configured and dimensioned to receive and retain said leg so as to exert a supportive, bracing force on the tree trunk;

removable fastening means to anchor said tree bracing assembly on the ground or to a tree grate adjacent said tree trunk;

said means for retaining said straps comprising at least one releasable strap retaining member with a single first serrated edge, and being fixedly attached to one of said support members and further comprising at least one serrated strap channel and channel opening having a second serrated strap engaging edge through which a strap passes, the channel opening second serrated edge and retaining member first serrated edge acting in combination to engage said strap into gripping configuration with each of the first and second serrated edges, thereby prohibiting slippage of said strap and securing said straps and support members into firm frictional engagement about the tree trunk.

2. A tree bracing assembly as in claim 1 wherein each said support member comprises a protective portion attached thereto and disposed in confronting engagement with the exterior surface of the tree trunk and structured to minimize damage to the exterior surface of the tree trunk.

3. A tree bracing assembly as in claim 2 wherein said protective portion is vertically grooved to allow at least minimal water and air to flow between the tree trunk and the portion of the tree engaged by said protective portion.

4. A tree bracing assembly as in claim 1 wherein each said strap further comprises a connector portion formed thereon and disposed and structured to form each said strap into a substantially closed loop configuration about the tree trunk.

5. A tree bracing assembly as in claim 1 wherein each said support member includes at least two open-ended channels extending therethrough and disposed in substantially parallel, spaced relation to one another, each channel dimensioned and configured to allow one of said straps to movably pass therethrough such that each support member is concurrently movable along the length of said straps into any one of a plurality of supportive positions about a circumference of the tree trunk.

6. A tree bracing assembly as in claim 1 wherein each of the base members further comprises at least one opening to accommodate a ground mountable fastening means for maintaining the tree bracing assembly on the ground or secured to a tree grate.

7. A tree bracing assembly designed to support and maintain a tree in a substantially vertical position, said assembly comprising:
   at least three support members positionable in supporting and abutting engagement with a trunk of the tree to be supported;
   two flexible straps of sufficient length to surround the tree trunk, operatively, movably and independently aligned within each support member and cooperatively structured such that each support member is selectively positionable in surrounding relation to the tree trunk and concurrently positionable along the length of each strap in any one of a plurality of positions into removable, surrounding and supportive engagement with the tree trunk;
   a means for retaining said straps once the support members are in forced engagement about the exterior surface of the tree to be supported;
   an equal number of base members as support members;
   an equal number of base member brackets as base members, one bracket being fixedly attached to said top surface of each said base member;
   elongated legs equal in number to the base members, each leg having a distal end pivotally engaging said base member bracket which is configured to receive and retain said leg, one bracket being fixed to the top surface of each said base member, said base member being removably fixed to the ground, and a proximal end of each said leg pivotally disposed in abutting engagement with said outer surface of said support member which is configured and dimensioned to receive and retain said leg so as to exert a supportive, bracing force on the tree trunk;
   removable fastening means to anchor said tree bracing assembly on the ground or to a tree grate adjacent said tree trunk; and
   said means for tightening said straps once the support members are positioned about the tree comprising vertically configured spaced lateral projections with center-cut openings integrally molded in only one said support member and of a size and shape to accommodate a tool which when manually twisted bites into and decreases the circumference of each said strap around the tree trunk thereby forcing said support members into firmer frictional engagement with the exterior of the tree trunk.

8. A tree bracing assembly designed to support and maintain a tree in substantially upright position, said assembly comprising:
   at least three tree engaging support members disposable in supporting engagement with a trunk of a tree in spaced relation to one another;
   at least two flexible straps operatively disposed in surrounding relation to the tree trunk, concurrently and movably mounted on said three support members positionable in spaced relation to each other along the length thereof into any one of a plurality of support positions about a circumference of the tree trunk;
   strap adjustment means connected to one of said support members for releasably locking each strap tightly in place with two serrated edges;
   each of said support members further including a protective portion formed on said inner surface thereof and positionable in confronting engagement with an exterior surface of the tree trunk, said protective portion structured to minimize damage to the exterior surface of the tree trunk at said support positions;
   at least three tree brace support member hinges;
   at least three brace members each connected by a tree brace support member hinge to a different support member and each having an elongated configuration terminating at a proximal end and a distal end and angularly and pivotally oriented in interconnecting positions between the support members and a ground portion adjacent the tree trunk;
   each of said brace members being pivotally disposed and cooperatively received by the one support member with which it is engaged, to exert a supporting, bracing force on the tree trunk at said support member positions; and
   base member with fastening means to retain said bracing assembly on the ground or to a tree grate adjacent said tree trunk.

9. A tree bracing assembly comprising in combination:
   at least three support members with protective portion attached thereto independently and adjustably positionable in spaced relation to each other;
   means for fastening said support members together with protective portion in a circumferential and confronting engagement with the exterior of the tree trunk;
   at least three leg members pivotally each attached at the proximal end of and extending downwardly and outwardly from each support member, and pivotally attached at the distal end to a base member; and
   means for securing said base member on the ground or to a tree grate; and
   said means for fastening said support members together comprises two flexible elongated straps of lengths dimensioned to extend tree trunk and held in place by at least one flexible and releasable strap retaining member and strap channel each having at least one serrated edge in direct pressured engagement with each of said straps.

10. A tree bracing assembly designed to support and maintain a tree in a substantially vertical position, said assembly comprising:

at least three support members in supporting and abutting engagement with a trunk of the tree to be supported, each of said support members comprising an arcuate and vertically grooved resilient padded surface abutting the tree trunk;

two soft, flexible straps of sufficient length to surround the tree trunk, operatively, movably and independently aligned within each support member and cooperatively structured such that each support member is selectively positionable in surrounding relation to the tree trunk and concurrently positionable along the length of each strip in any one of a plurality of positions into removable, surrounding and supportive engagement with the tree trunk;

a means for tightening said straps connected to one of said support members including a pair of serrated edges connected to one of said support members for engaging said straps once the support members are positioned about the tree;

a means for retaining said straps once the support members are in forced engagement about the exterior surface of the tree to be supported;

an equal number of base members as support members;

an equal number of base member brackets as base members, one bracket being fixedly attached to said top surface of each said base member;

elongated legs equal in number to the base members, each leg having a distal end pivotally engaging said base member bracket which is configured to receive and retain said leg, one bracket being fixed to the top surface of each said base member, said base member being removably fixed to the ground or to a tree grate, and a proximal end of each said leg pivotally disposed in abutting engagement with said outer surface of said support member which is configured and dimensioned to receive and to retain said leg so as to exert a supportive, bracing force on the tree trunk, and a tightenable fastener extending through said bracket and support member so as to hold the brace member in firm frictional engagement with the ground or tree grate and with the tree trunk respectively; and removable fastening means to anchor said tree bracing assembly on the ground or to a tree grate adjacent said tree trunk, said fastening means comprising a stake or a "J" bolt.

* * * * *